United States Patent [19]

Williams

[11] 4,228,443
[45] Oct. 14, 1980

[54] GRAPHIC ELECTRIC RECORDER

[75] Inventor: George C. Williams, South Easton, Mass.

[73] Assignee: Alden Research Foundation, Brockton, Mass.

[21] Appl. No.: 966,811

[22] Filed: Dec. 6, 1978

[51] Int. Cl.³ .............................................. G01D 15/06
[52] U.S. Cl. ..................................... 346/165; 346/145
[58] Field of Search ................... 346/165, 139 C, 145, 346/101

[56] References Cited
U.S. PATENT DOCUMENTS

| | | | |
|---|---|---|---|
| 2,575,959 | 11/1951 | Hogan | 346/101 |
| 3,638,237 | 1/1972 | Alden | 346/145 |
| 3,875,577 | 4/1975 | Alden | 346/165 |
| 3,890,622 | 6/1975 | Alden | 346/165 |

FOREIGN PATENT DOCUMENTS 1084485  6/1960  Fed. Rep. of Germany ........... 346/165

Primary Examiner—John H. Wolff
Attorney, Agent, or Firm—James H. Grover

[57] ABSTRACT

A facsimile recorder for marking electro-sensitive paper including a housing with a base and a cover and a platform disposed within the housing for receiving a cassette which contains a web of paper stored as a roll. A scanning electrode is disposed within the housing in front of the platform and a linear electrode is operatively disposed relative to the scanning electrode. The linear electrode is arranged substantially normal to the path of the paper and parallel to the axis of the paper roll. The cassette is held parallel to the linear electrode by means of a plate which extends from the cover and engages the face of the cassette. Through this arrangement, the paper is withdrawn from the cassette precisely normal to the linear electrode and high quality graphic images are produced on the paper without jamming or misalignment.

10 Claims, 2 Drawing Figures

GRAPHIC ELECTRIC RECORDER

BACKGROUND OF THE INVENTION

In facsimile recording equipment such as described herein a sensitive web of recording paper is fed between electrodes which scan the web line by line and mark an image on successive lines transversely of the direction of feed of the web in response to a series of electric signals. One of the electrodes is a fixed linear strip of metal and the other scans and marks graphic information electrically on the web as it is drawn from the cassette through the recording zone. Constraints on the equipment require precise registry of the web as it is drawn between the two electrodes together with substantial parallelism between the axis of the roll of recording paper and the linear electrode so that a sharp, clear image is produced and also to prevent the paper from jamming as it is drawn through the recording zone.

SUMMARY OF THE INVENTION

According to the present invention a graphic recorder for marking electro-sensitive recording paper includes a housing with a base and a cover with a platform disposed within the housing which receives a cassette that contains a roll of recording paper. A scanning electrode is disposed in the housing in front of the platform in a recording zone and is cooperatively associated with a linear electrode that is arranged substantially normal to the path of paper being withdrawn from the cassette and substantially parallel to the axis of the roll of paper. Feed rollers are disposed in front of the recording zone parallel to the axis of the roll of recording paper and cooperate to withdraw the paper from the cassette. With the present equipment, alignment of the paper and the linear electrode is assured by a plate which extends from the cover and engages the face of the cassette to force it against the housing. The plate is arranged substantially parallel to the axis of the roll of recording paper and carries with it a linear electrode which is disposed normal to the path of the paper being withdrawn from the cassette.

DESCRIPTION OF THE PREFERRED EMBODIMENTS

Figure 1:
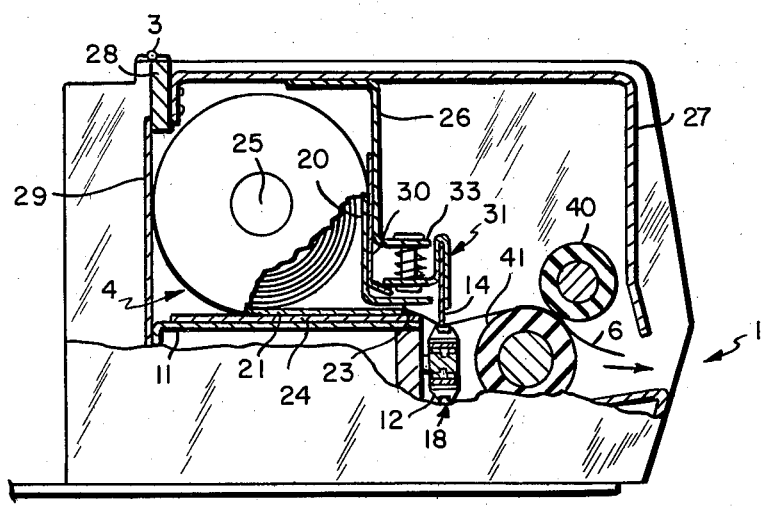
FIG. 1 is a side section of a facsimile recorder using electro-sensitive paper according to the present invention.
Figure 2:
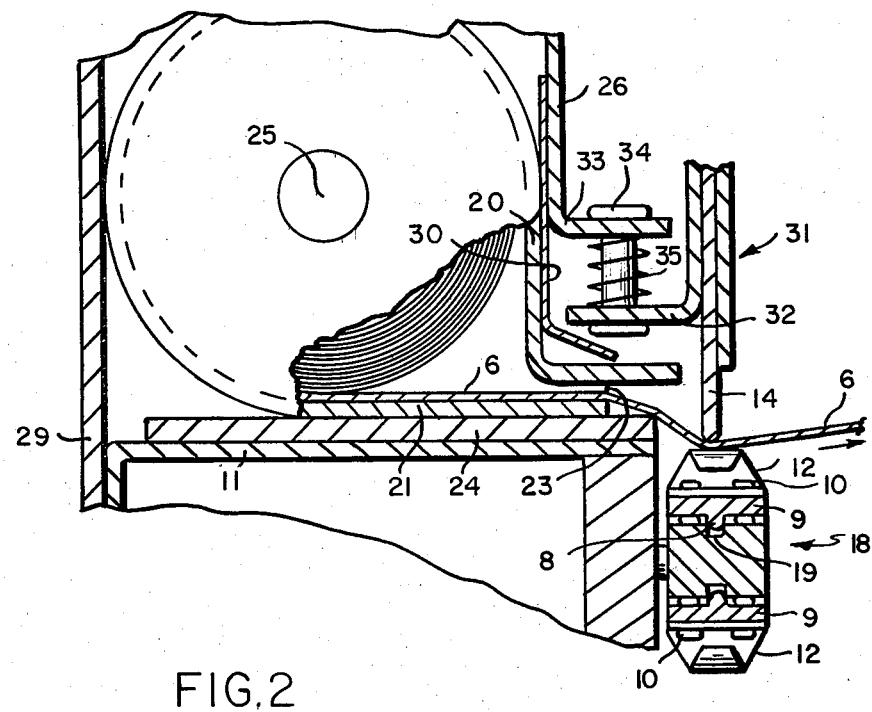
FIG. 2 is an enlarged view of the recording zone and cassette holder within the facsimile recording device.

As shown in FIGS. 1 and 2 an electric graphic recorder comprises a base 1 with a cover 27 hinged to the base at 3. A platform 11 on base 1 is arranged to support a cassette 4 in the recorder. Cover 27 is electrically connected to base 1 and to a grounded terminal of a facsimile signal recording amplifier which constitutes a first signal terminal. The facsimile amplifier is also connected through an insulated lead to support 18 and in turn to a stylus 12 which constitutes a second signal as described more fully in U.S. patent application Ser. No. 777,044, filed Mar. 14, 1977 by Kestutis Bliudnikas and assigned to the same assignee as the present application.

The stylus 12 comprises a foot and a toe with a leg integral with the foot and extending upwardly from a hinge at the foot to a bend forming a scanning surface which traverses the recording paper 6 in opposition to a blade electrode 14. The stylus 12 is attached to an endless belt 9 by an eyelet 10 set through perforations that are formed therein. An external detent 8 is slidably disposed in a track 19 and confines the belt 9 as it orbits on support 18 for a scan, electric signals are pressed upon the equipment and a marking will be made upon the web of electrolytic paper 6. After each scan of the stylus 12 across the web of recording paper 6, feed rolls 40 and 41 index to withdraw a predetermined length of paper from the cassette roll equal in length to the width of a scan.

The cassette 4 is formed of a generally cylindrical section which encloses the roll of electrolytic paper. A flat face section 20 is disposed on the front of the cassette and is constructed to be parallel to the linear electrode 14 and a flat base section 21 is formed on the bottom and rests upon the platform 11. If desired, an insulating plate 24 can be disposed between the platform 11 and the base section 21 of the cassette 4. Paper is withdrawn between the convergence of the face section 20 and the base section 21 through a generally tubular extension which terminates in a mouth 23. While in the cassette, the axis of the roll of paper can be held by detents 25 formed on the side of the cassette 4 and thus when the paper is drawn by roller 40 and 41, the axis of the roll 6 is maintained parallel to the linear electrode 14.

A plate 26 is suspended from the top of the cover 27 and which in turn is attached to bar 28 that is fixed across the width of the recorder. The plate 26 urges against the face section 20 of cassette and in turn forces the rear of the cassette 4 against an enclosure plate 29 thereby aligning the cassette 4 (and the axis of the roll of paper) parallel to the face of the cassette 20 and in turn parallel with the linear electrode 14. Preferably a resilient member 30 is affixed to the lower portion of plate 26 and disposed against the face portion 20 of the cassette so as to provide additional support between the end of the plate 26 and the cassette 4.

The linear electrode 14 extends across the entire width of the mouth 23 of the cassette 4 and is held within a U-shaped member that has a support leg 32 extending at right angles from the side thereof. A second leg 33 extends from plate 26 and holds leg 32 by means of pins 34 (only one of which is shown). The leg 32 is separated from the second leg 33 by means of springs 35 which urge them apart. Through the use of the springs, compensation in minor variations in tension is provided as the paper is withdrawn from the roll. The linear electrode 14 is thus somewhat free to float without disturbing the linearity produced by the urging of plate 26 against the face portion 20 of cassette 4.

It will be appreciated that the use of a cover mounted plate to hold the cassette in the recorder keeps the cassette firmly in a predetermined alignment with the linear electrode and the use of a linear electrode that is mounted upon the holddown member provides for precise registry of the blade with reference to the scanning electrode. Through the use of a linear electrode that is free to move and directly related to the cover mounted plate, minor variations in tension which occur as the paper is withdrawn from the roll will be tolerated within the equipment without disturbing the predetermined linearity and relationship between the various components. Quite advantageously, the condition of the linear electrode can be easily observed and can be changed as needed by removing it from the pins. Observation is quite readily accomplished by lifting the cover and looking to see if any appreciable erosion has occurred.

It is apparent that modifications and changes can be made within the spirit and scope of the present invention but it is our intention, however, only to be limited by the present claims.

I claim:

1. A graphic electric recorder for marking an electrosensitive recording paper, said recorder comprising:
    a housing including a base and a cover and a rear wall disposed on the base;
    a platform disposed within said housing for receiving a cassette containing a roll of recording paper;
    scanning electrode means disposed within said housing and in front of said platform;
    linear electrode means disposed in operative relationship with said scanning electrode, said linear electrode means being arranged substantially normal to the path of paper being withdrawn from a cassette and substantially parallel to the rear wall;
    feed roll means disposed in front of the electrodes, said feed roll means being disposed substantially parallel to the roll of recording paper and adapted to withdraw said paper from a cassette;
    means on the housing for engaging a cassette to align the roll of recording paper substantially parallel to the linear electrode and for holding said linear electrode.

2. The graphic electric recorder according to claim 1 wherein the means for engaging a cassette is disposed upon the cover.

3. The graphic electric recorder according to claim 2 wherein the means to align is a rigid plate, one end of said plate being attached to said cover and a side being arranged to butt against the face of said cassette, whereby the cassette is urged so as to dispose the roll substantially parallel to the linear electrode.

4. The graphic electric recorder according to claim 3 further including means attaching the linear electrode to said plate and means to urge said linear electrode away from said attaching means and towards said scanning electrode.

5. The graphic electric recorder according to claim 4 wherein the linear electrode holding means is a U-shaped member having at least one bracket extending from one side thereof, said linear electrode being disposed between the legs of the U, said bracket forming the means to join the linear electrode holding means to the attaching means.

6. A graphic electric recorder for marking an electrosensitive recording paper, said recorder comprising:
    a housing including a base and a cover;
    a platform disposed within said housing for receiving a cassette containing a roll of recording paper;
    scanning electrode means disposed within said housing and in front of said platform;
    feed roll means disposed in said housing, said feed roll means being disposed substantially parallel to the roll of recording paper and arranged to withdraw said paper from a cassette;
    scanning electrode means disposed within said housing and between said cassette and a feed roll means;
    linear electrode means disposed in operative relationship with said scanning electrode, said linear electrode means being arranged substantially normal to the path of paper being withdrawn from a cassette and substantially parallel to the roll of paper, alignment means on the cover of the housing for engaging the cassette to align the roll of recording paper substantially parallel to the linear electrode, said linear electrode being carried on said alignment means whereby when said cover is closed, said alignment means will engage the cassette and force it into place on said platform and simultaneously dispose said linear electrode into the parallel relationship with said paper supply roll.

7. The recording device according to claim 6 wherein the alignment means is a plate, attached at one end to said cover and one side of which is arranged to butt against the face of a cassette, whereby the cassette is urged so that the roll of paper disposed therein will be parallel to the linear electrode.

8. the recording device according to claim 7 wherein the linear electrode is attached to the lower end of said plate.

9. the recording device according to claim 7, wherein a mounting bracket extends from said plate and is attached to a second bracket, said linear electrode being attached to said second bracket.

10. the recording device according to claim 9 wherein said second bracket is attached to said first bracket by at least one post, said second bracket being urged from said first bracket by a spring.

* * * * *